United States Patent [19]

Stavrou

[11] 3,751,725

[45] Aug. 7, 1973

[54] TRIMMER CAPACITOR

[76] Inventor: Steven Stavrou, P.O. Box 39, Collingwood, Ontario, Canada

[22] Filed: June 28, 1972

[21] Appl. No.: 267,242

[52] U.S. Cl. ............................ 317/249 R, 29/25.42
[51] Int. Cl. ............................................ H01g 5/16
[58] Field of Search ............... 317/249 R; 29/25.42; 85/47; 336/192

[56] References Cited
UNITED STATES PATENTS

| | | | |
|---|---|---|---|
| 2,112,815 | 3/1938 | Perret | 317/249 R |
| 2,119,107 | 5/1938 | Ketcham | 317/249 R |
| 2,163,237 | 6/1939 | Flanzer | 317/249 R |
| 2,201,725 | 5/1940 | Godsey | 317/249 R |
| 2,745,993 | 5/1956 | Foster | 317/249 R |
| 2,828,393 | 3/1958 | Wingard | 336/192 X |
| 3,044,341 | 7/1962 | Stern | 85/47 |

Primary Examiner—E. A. Goldberg
Attorney—George A. Smith, Jr.

[57] ABSTRACT

A trimmer capacitor utilizes a molded plastic base having integral projections which extend through openings in conductive plates, and which are heated to form expanded portions holding the conductive plates in place against the base. Integral ridges extend outwardly from the face of the base to form alignment guides which facilitate assembly. A self-tapping adjustment screw is threaded directly into the molded plastic base.

2 Claims, 10 Drawing Figures

TRIMMER CAPACITOR

BRIEF SUMMARY OF THE INVENTION

This invention relates to trimmer capacitors of the type used in communications equipment to permit capacitance adjustments for the purposes of alignment and calibration.

A typical trimmer capacitor comprises a pair of plates mounted on a base in such a way that portions of the plates overlap each other. The overlapping portions of the plates are separated by a mica insulator, and a screw is provided for tightening the plates against the insulator to adjust the distance between the plates and therefore the capacitance. Heretofore, trimmer capacitor bases have generally been formed of ceramic material, and the use of ceramic material gives rise to a number of drawbacks which are overcome by the present invention.

Eyelets, rivets or other fasteners are needed in order to fasten conductive plates to a ceramic base. The need for separate fasteners gives rise to increased costs.

The cost of production of a trimmer capacitor having a ceramic base is further increased by the need for a separate threaded bracket which is located underneath the base, and into which the tightening screw is threaded. This separate bracket is needed since ceramic materials cannot be conveniently threaded, and since any threads formed therein would not be strong enough to sustain the forces involved in tightening the plates against each other.

In the assembly of the trimmer capacitor having a ceramic base, there is involved a time-consuming alignment of the various parts with respect to the ceramic base. The mica insulator is usually held by the same eyelet which holds the conductive plate which is closest to the ceramic base. Accordingly, the insulator, and that plate must be simultaneously aligned with the eyelet hole to which they correspond. The other plate must also be aligned with an eyelet hole, and the tightening screw, the threaded bracket, and insulating washer and a metal washer must all be simultaneously aligned with a central hole in the ceramic base. These alignment operations are time-consuming, and maintain the cost of assembly at a high level.

The trimmer capacitor in accordance with this invention utilizes a molded plastic base having integral projections for retaining the conductive plates, integral ridges forming a pocket for facilitating the alignment of parts and a central opening in which threads are formed by a self-tapping tightening screw.

The principal object of the invention is to reduce the cost of manufacture of a trimmer capacitor by decreasing the number of required parts and facilitating its assembly.

Other and more detailed objects will be apparent from the following description when read in conjunction with the drawings.

DETAILED DESCRIPTION

Figure 1:
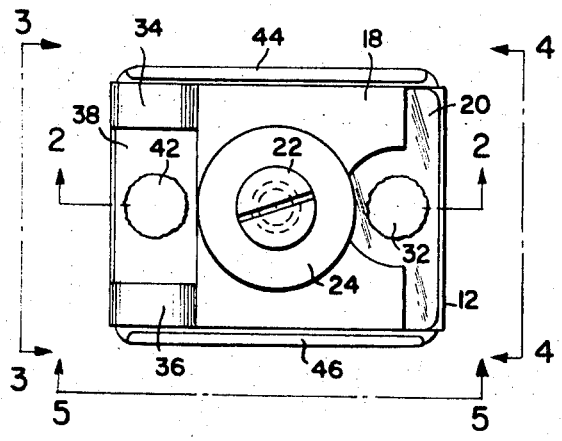
FIG. 1 is a top plan view of a trimmer capacitor in accordance with the invention.

FIGS. 1 through 6 inclusive illustrate the construction of the preferred trimmer capacitor in accordance with the invention.

A first conductive plate 12 and a second conductive plate 14 are respectively provided with portions 16 and 18 which overlap each other to form a capacitor. These overlapping portions are separated from each other by a thin mica insulator 20 which is located between the overlapping portions of plates 12 and 14.

Base 22 is molded from a thermoplastic material such as polysulphone. (Other thermoplastic materials may be used as well.) Base 22 is shown underlying the overlapping portions of the plates and part of the non-overlapping portions of the plates. A tightening screw 22, having a washer 24 underneath its head is threaded into a central opening 26 which extends through the base from its upper face to its underside. When rotated in the clockwise direction (as viewed in FIG. 1) screw 22 tightens overlapping portions 16 and 18 against mica insulator 20, thereby bringing the overlapping portions closer together and increasing the electrical capacitance of the trimmer. Plate 12 includes a tab 26 which is adapted to extend through an opening in a printed circuit board, and plate 14 is similarly provided with a tab 28. These tabs provide the electrical connection to the trimmer and also serve to hold the trimmer in position against the circuit board.

The upper face of base 22 is provided with a first integral projection 30 which extends through an opening in the non-overlapping portion of plate 12 and through an opening in insulator 20. Above the opening in insulator 20, projection 30 is provided with an expanded portion 32 which holds insulator 20 and plate 12 securely in place against the face of base 22.

Portion 18 of plate 14 is connected to the remainder of plate 14 by rounded members 34 and 36, which act as hinges. Between members 34 and 36, there is provided a portion 38, integral with plate 14, and overlying the upper face of base 22. Portion 38 is provided with an opening through which extends a projection 40 which is integral with the base. An expanded portion 42, similar to 32, secures portion 38 of plate 14 to the base.

A pair of parallel ridges 44 and 46 are integrally molded with the plastic base, and extend outwardly from its upper face at the edges thereof. These ridges form a pocket for receiving plates 12 and 14 and insulator 20. They aid in the alignment of the plate and insulator during assembly of the trimmer as explained hereinafter.

The underside of the base is provided with a boss 48, and opening 26 extends centrally through boss 48 with the result that the length of the threads in the base which cooperate with screw 22 is extended to provide a more secure fastening. Integrally molded L-shaped feet 50, 52, 54 and 56 are provided on the underside of the base. These feet may be molded in any desired vertical dimensions in order to achieve the desired stand-off distance of the trimmer from the circuit board.

FIGS. 7 through 10 inclusive show a molded plastic base 58 without the various other parts making up the capacitor and in its condition prior to assembly of the capacitor. Central opening 60 is provided with a smooth cylindrical wall 62. The diameter of opening 60 is such that the tightening screw will form threads in wall 60 when the screw is threaded into the opening. This is preferably done when the capacitor plates and insulator are in place against the upper face 64 of the base in order to eliminate the tapping step which would otherwise be required.

Figure 2:
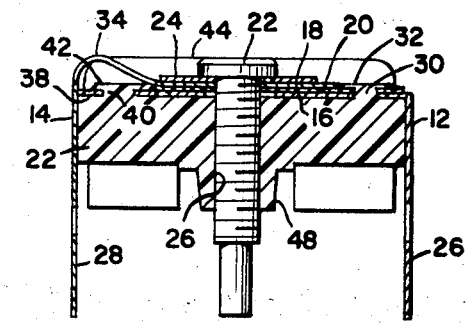
FIG. 2 is a vertical section taken on the plane 2—2 indicated in FIG. 1.
Figure 3:
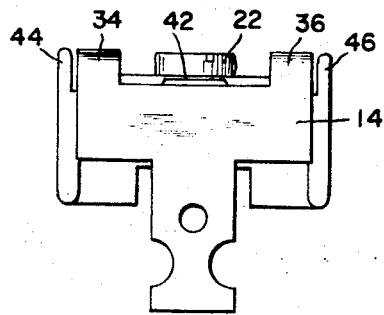
FIG. 3 is a side elevation as viewed from the left-hand side of FIG. 1.
Figure 4:
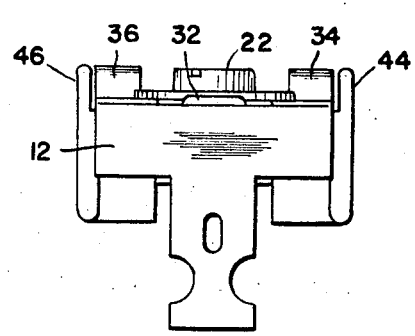
FIG. 4 is a side-elevation as viewed from the right-hand side of FIG. 1.
Figure 5:
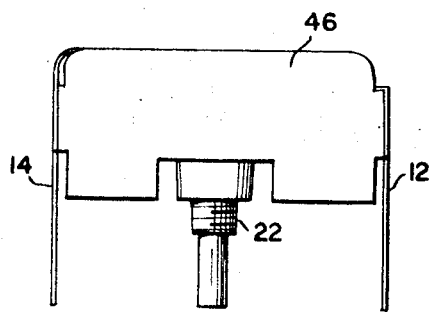
FIG. 5 is a front elevation as viewed from the bottom of FIG. 1.
Figure 6:
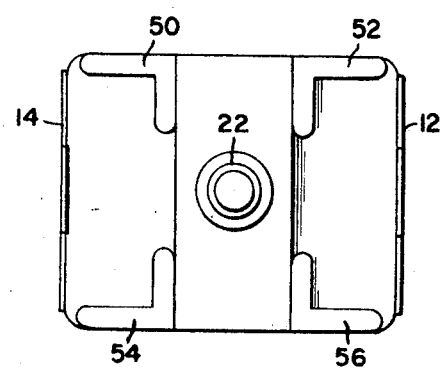
FIG. 6 is a bottom plan view of the same trimmer capacitor as shown in FIG. 1.
Figure 8:
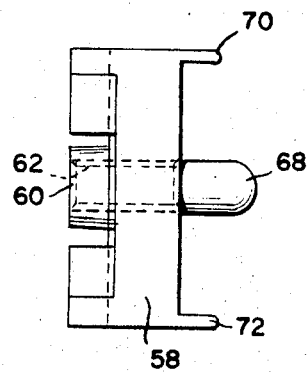
FIG. 8 is a side elevation of the base as viewed from the left-hand side of FIG. 7.
Figure 7:
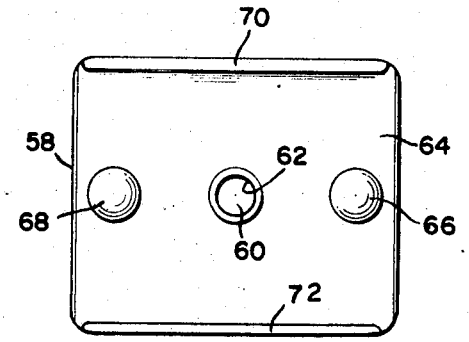
FIG. 7 is a top plan view of the molded plastic base.
Figure 9:
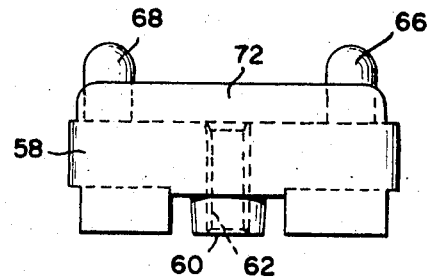
FIG. 9 is a front elevation of the base as viewed from the bottom of FIG. 7.
Figure 10:
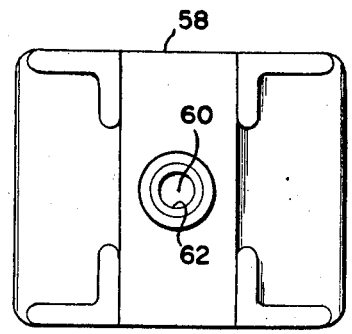
FIG. 10 is a bottom plan view of the base.

In its initial condition, base 64 is provided with a pair of projections 66 and 68, both of which extend upwardly from and perpendicular to face 64. Projections 66 and 68 are generally cylindrical but have rounded ends as shown. The diameters of the cylindrical parts of the projections are such as to permit the openings in the capacitor plate and mica insulator to fit over them readily, but do not allow more than a small amount of lateral movement of the plates and insulator. Heat may be applied to the rounded portions of projections 66 and 68 by any suitable means, such as the hot metal tip of a soldering iron. The application of heat causes the thermoplastic projections to melt, thereby producing the expanded portions such as 32 and 42 (FIG. 2).

The molded plastic base can be made larger so that two or more pairs of plates can be mounted on it, and various other modifications can be made without departing from the invention as defined in the following claims.

I claim:

1. A trimmer capacitor comprising first and second conductive plates, each having a portion overlapping the other and a non-overlapping portion, insulating means located between the overlapping portions of said plates, means for adjusting the distance between the overlapping portions of said conductive plates, and a molded plastic base having a face underlying at least part of the non-overlapping portion of each of said plates, said molded plastic base having a first projection, integrally molded with the base, extending through an opening in the non-overlapping portion of one of said plates, a second projection, integrally molded with the base, extending through an opening in the non-overlapping portion of the other of said plates, means extending outwardly from said face and integrally molded therewith, said outwardly extending means being arranged to form a pocket for receiving said plates and insulating means and impeding rotation of the plates and insulating means, and means on each of said projections for holding the non-overlapping portion through which it extends in place against the face of the base.

2. A trimmer capacitor comprising first and second conductive plates, each having a portion overlapping the other and a non-overlapping portion, insulating means located between the overlapping portions of said plates, means for adjusting the distance between the overlapping portions of said conductive plates, and a molded plastic base having a face underlying at least part of the non-overlapping portion of each of said plates, said molded plastic base having a first projection, integrally molded with the base, extending through an opening in the non-overlapping portion of one of said plates, a second projection, integrally molded with the base, extending through an opening in the non-overlapping portion of the other of said plates, a pair of ridges extending outwardly from said face and integrally molded therewith, said ridges being arranged parallel to each other and separated so as to form a pocket for receiving said plates and insulating means and impeding rotation of the plates and insulating means, and means on each of said projections for holding the non-overlapping portion through which it extends in place against the face of the base.

* * * * *